(12) United States Patent
Raybern

(10) Patent No.: US 12,503,235 B2
(45) Date of Patent: Dec. 23, 2025

(54) LIFE VEST CONTAINER, METHOD FOR ASSEMBLING A LIFE VEST CONTAINER AND METHOD FOR REMOVING A LIFE VEST FROM A LIFE VEST CONTAINER

(71) Applicant: Textron Aviation, Inc., Wichita, KS (US)

(72) Inventor: Blake David Raybern, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 178 days.

(21) Appl. No.: 18/238,347

(22) Filed: Aug. 25, 2023

(65) Prior Publication Data

US 2025/0066021 A1 Feb. 27, 2025

(51) Int. Cl.
*B64D 11/06* (2006.01)

(52) U.S. Cl.
CPC ...... *B64D 11/0631* (2014.12); *B64D 11/0643* (2014.12)

(58) Field of Classification Search
CPC .......... B64D 11/0631; B64D 11/0643
See application file for complete search history.

(56) References Cited

U.S. PATENT DOCUMENTS

| | | | | |
|---|---|---|---|---|
| 6,588,839 B1* | 7/2003 | Salzer | ....... | B60N 3/06 |
| | | | | 297/188.03 |
| 8,292,223 B2* | 10/2012 | Lamoree | ....... | B64D 11/0632 |
| | | | | 414/412 |
| 10,577,063 B2* | 3/2020 | Schalla | ....... | B65D 77/20 |
| 11,820,514 B2* | 11/2023 | Jensen | ....... | B64D 25/04 |
| 12,077,302 B2* | 9/2024 | Newbold | ....... | B64D 11/064 |
| 2008/0106127 A1* | 5/2008 | Hough | ....... | B64D 11/0629 |
| | | | | 297/188.08 |
| 2015/0034641 A1* | 2/2015 | Aruga | ....... | B65D 25/38 |
| | | | | 220/214 |
| 2019/0077491 A1* | 3/2019 | Schalla | ....... | B63C 9/23 |
| 2019/0233121 A1* | 8/2019 | Wunderlich | ....... | B64D 11/0631 |
| 2022/0144437 A1* | 5/2022 | Newbold | ....... | B64D 11/0631 |
| 2022/0411071 A1* | 12/2022 | Jensen | ....... | B64D 11/0631 |
| 2023/0002061 A1* | 1/2023 | Jensen | ....... | B64D 11/0643 |
| 2025/0066021 A1* | 2/2025 | Raybern | ....... | B64D 11/0643 |

\* cited by examiner

*Primary Examiner* — Philip F Gabler
(74) *Attorney, Agent, or Firm* — SLATER MATSIL, LLP

(57) ABSTRACT

A life vest container, a method for assembling a life vest container and a method for removing a life vest from a life vest container are disclosed. In an embodiment a leg rest includes linkages of a deployment and stowage mechanism, the linkages of the deployment and stowage mechanism being connectable to a seat, a mounting fixture connected to the linkages and a container secured to the mounting fixture, the container being configured to store a life vest.

13 Claims, 13 Drawing Sheets

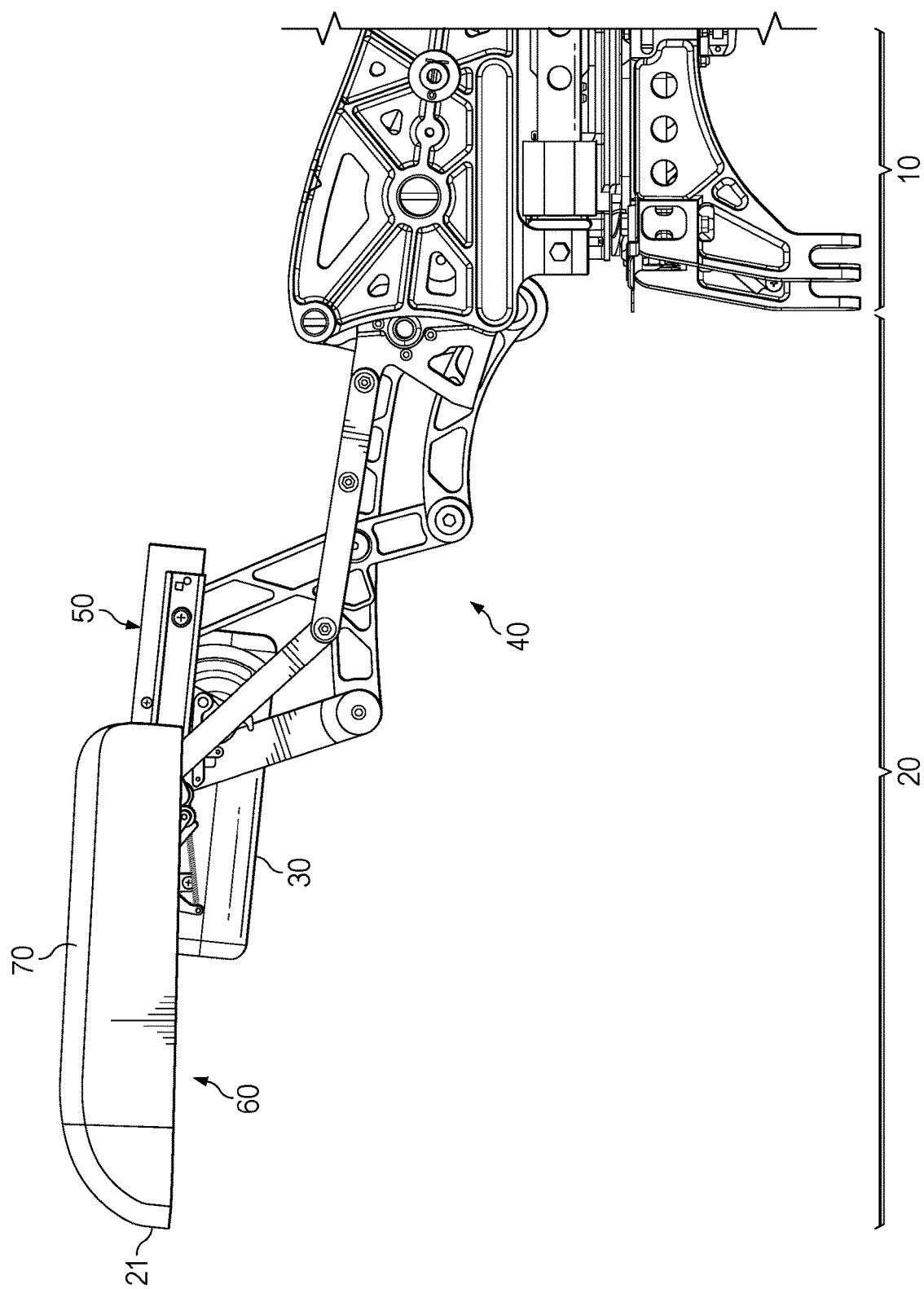

LIFE VEST CONTAINER, METHOD FOR ASSEMBLING A LIFE VEST CONTAINER AND METHOD FOR REMOVING A LIFE VEST FROM A LIFE VEST CONTAINER

TECHNICAL FIELD

The present invention relates generally to a life vest container and in particular to a life vest container arranged in a leg rest. The present invention further relates to a method for removing a life vest from a life vest container.

BACKGROUND

Generally, life vests and life vest containers are known.

SUMMARY

Embodiments provide a leg rest. The leg rest includes linkages of a deployment and stowage mechanism, the linkages of the deployment and stowage mechanism being connectable to a seat, a mounting fixture connected to the linkages and a container secured to the mounting fixture, the container being configured to store a life vest.

Further embodiments provide a method for assembling a leg rest. The method includes providing a mounting fixture, connecting deployment and stowage mechanism linkages to the mounting fixture, the deployment and stowage mechanism linkages being connectable to a seat and fixing a container to the mounting fixture, the container being configured to store a life vest.

Yet other embodiments provide a method for removing a life vest from a life vest container placed in a leg rest of a seat. The method includes removing a leg rest pad from an extension frame of the leg rest, removing a cover from the life vest container, the life vest container being secured to a mounting fixture of the leg rest and the extension frame being movably connected to the mounting fixture, and fetching the life vest.

DETAIL DESCRIPTION OF THE DRAWINGS

For a more complete understanding of the present invention, and the advantages thereof, reference is now made to the following descriptions taken in conjunction with the accompanying drawings, in which:

FIG. 1 shows a side view of a leg rest with a life vest container in a deployed position according to embodiments;

DETAILED DESCRIPTION OF ILLUSTRATIVE EMBODIMENTS

Figure 2A:
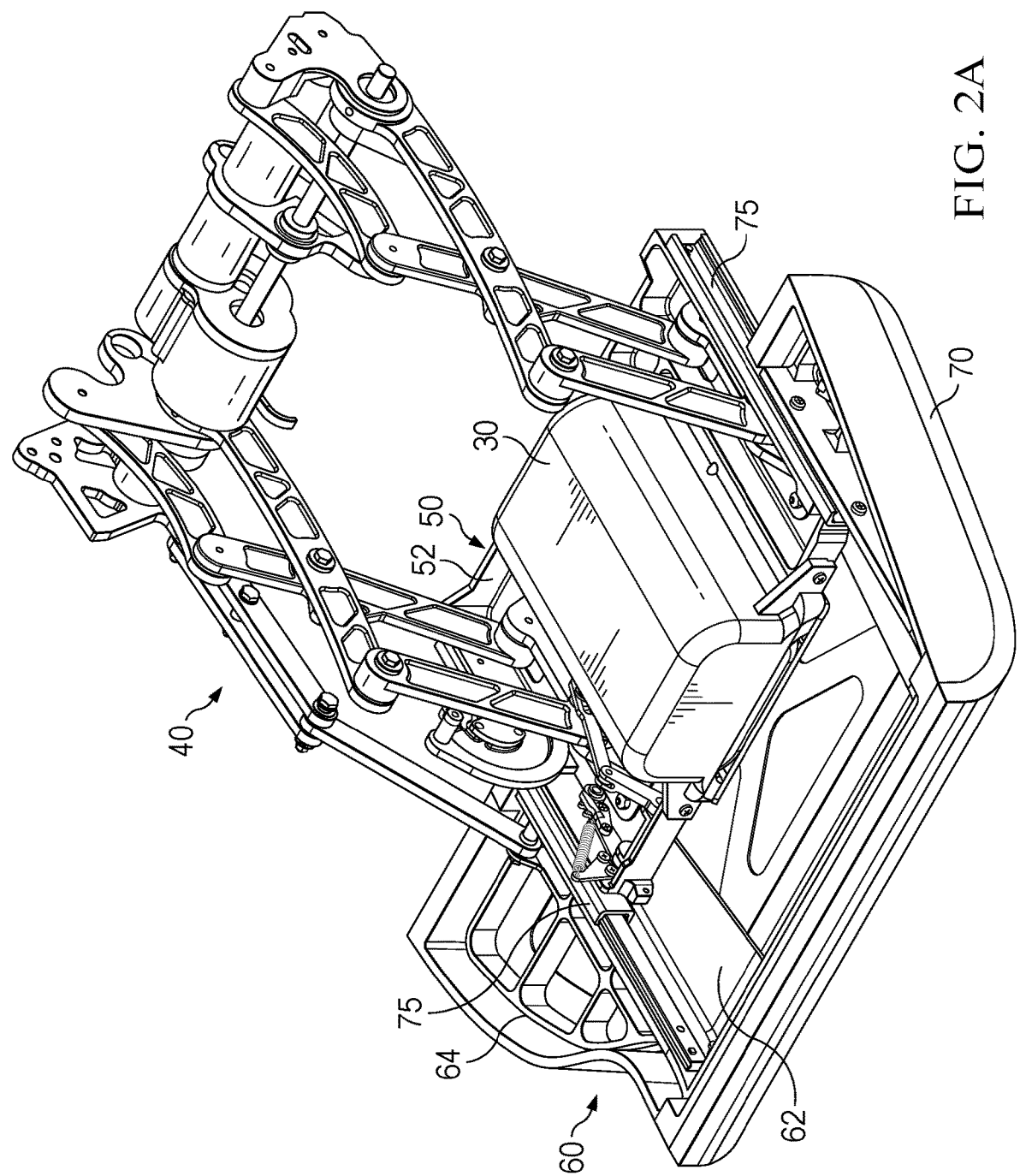
FIG. 2A shows a bottom perspective view of the leg rest with the life vest container according to embodiments.

FIG. 1 shows an airplane or aircraft seat 10 with an extendable leg rest 20. The motorized leg rest 20 is connected to an airplane seat 10 via a deployment and stowage mechanism 40. FIG. 1 shows the leg rest 10 in its deployed. The life vest container 30 is secured in and to the leg rest 20 and not to the aircraft seat 10.

The motorized leg rest 20 receives its motion power from a gearbox/motor located in the seat 10. The gearbox/motor provides the power to a plurality of linkages of the deployment and stowage mechanism 40 so that the linkages move the leg rest 20 in a rotational and non-linear process and so that the front edge 21 of the leg rest 20 does not contact the cabin floor of the airplane. The motorized leg rest 20 also includes a mounting fixture 50, an extension frame 60 and a leg rest pad 70. The mounting fixture 50 and the extension frame 60 are movable against each other by an extension and retraction mechanism. The extension mechanism may be a spring and the retraction mechanism may be system comprising several movable pieces. This is described in patent application (application Ser. No. 18/238,365, filed on Aug. 25, 2023) entitled "Leg Rest Extension Mechanism and Method for Operating the Leg Rest Extension Mechanism" which application is hereby incorporated herein by reference.

Figure 2B:
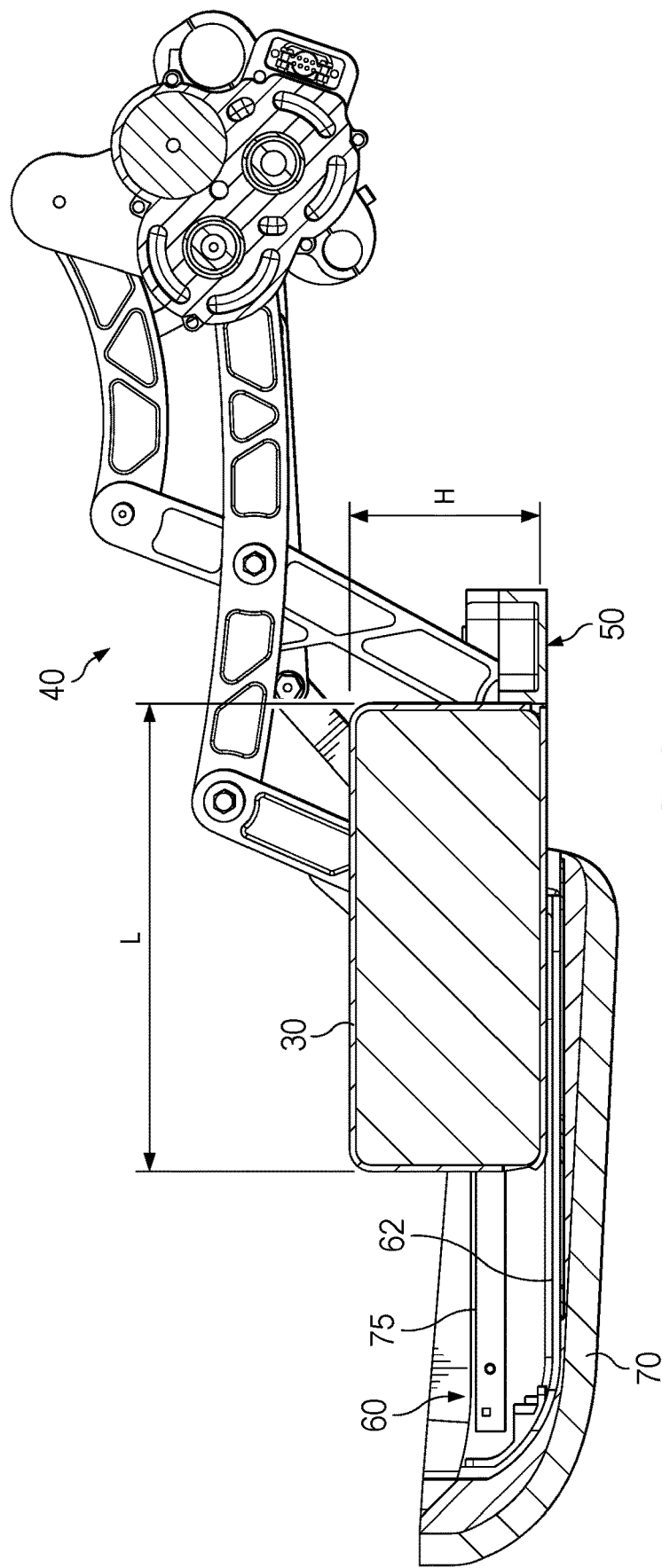
FIG. 2B shows a cross-sectional view of the leg rest with the life vest container according to embodiments.

FIG. 2A shows a bottom perspective view of the leg rest 20 and in particular the mounting fixture 50 with the life vest container 30 secured to it and FIG. 2B shows a related cross-sectional view. The Figures also show the extension frame 60 and the leg rest pad 70 removably secured to the extension frame 60.

In various embodiments, the leg rest mounting fixture 50 may be shaped as a U although other shapes are possible. The mounting fixture 50 comprises a frame plate 52 comprising a frame connected to a plate 51 at its bottom side. The frame plate 52 may be flat and the frame may comprise cross beams or a comb structure. The mounting fixture 50 may have a symmetrical or an asymmetrical U shape. For example, an asymmetrical mounting fixture 50 may be used when one deployment and stowage mechanism 40 and/or extension and retraction mechanism is used while a symmetrical mounting fixture 50 may be used when two deployment and stowage mechanisms 40 and/or extension and retraction mechanism are used. The mounting fixture 50 may be made from metal such as aluminum. In various embodiments, the mounting fixture 50 is covered (wrapped) or partially covered (wrapped) in leather since it is partially visible.

In various embodiments, the extension frame 60 may also be U shaped although other shapes are possible. The extension frame 60 comprises a frame plate 62. The bottom side of the frame plate 62 may be substantially flat. The open side of the U of the frame 60 may face the open side of the U of the fixture 50. Inner sides of the long legs of the U of the frame plate 62 may be arranged vis-a-vis outer sides of the long legs of the U of the frame plate 52 of the fixture 50. A comb structure 64 may extend from an outer side of each long leg of the U shaped frame plate 62. The two comb structures 64 may have the same or different structures and dimensions. The extension frame 60 is made from metal such as aluminum.

In various embodiments, a connector 75 is sandwiched between the mounting fixture 50 and the extension frame 60. The connector 75 may guide the extension frame 60 with respect to the mounting fixture 50. Each connector 75 might be placed between an outer side of a long leg of the frame plate 52 of the mounting fixture 50 and the inner side of the long leg of the fame plate 62 of the extension frame 60. In various embodiments there are two connectors 75, each between one long leg of the frame plates 52, 62. In some embodiments the connector 75 is not an individual stand-alone element but partially integrated in the leg rest mounting fixture 50 and the leg rest extension frame 60. The connector 75 may be a telescope rail. Alternatively, the connector 75 may be a rail and carriage system. The connector 75 might be made from a metal such as aluminum.

In various embodiments, leg rest pad 70 is fixedly connected to the extension frame 60. For example, the pad 70 may be mounted to a top side of the extension frame 60 with 4 ball catchers to allow easy removal of the pad 70 from the extension frame 60. The leg rest pad 70 may completely cover the mounting frame 60 in top view when installed. The pad 70 comprises a cushion on which the passenger can place his or her leg. The pad 70 may be foam in a plastic enclosure and, e.g., covered in leather. The pad 70 may use the extension frame 60 as additional structural support to prevent flexing of the cushion.

In various embodiments, the life vest container 30 (see also FIGS. 3A-3E, 4A and 4C) is placed within the U shape of the mounting fixture 50, meaning it is arranged between the two long legs of the U of the mounting fixture 50. The container 30 is a 3 dimensional device. The container 30 has a length L, a width W and a height H (see FIG. 4C). The container 30 is arranged so that the length L is arranged parallel to the long legs of the U of the mounting fixture 50, so that the width W is arranged parallel to a distance between the long legs of the U and so that the height H extends in a direction away from the extension frame 60 and towards the deployment and stowage mechanism 40 (see FIG. 2A). The container 30 is made from metal such as aluminum. Alternatively, the container 30 is made from plastic. In various embodiments magnets 38 are located at the top rim 39 of the bucket structure or open box 35 and steel plates 112 are located (inserted or embedded) in the cover 110 (see FIGS. 4A-4C) opposite the magnets 38. Alternatively, magnets are arranged in the cover 110 and the steel plates are embedded or inserted in the rim 39 of the bucket structure or open box 35.

The life vest container 30 comprises a bucket structure or a box 35 with an opening 32 on a top side and a cover (or lid or plate) 110 covering the bucket structure or open box 35 as shown in FIGS. 3A-3D and 4A-4C. The cover 110 may include a hole 114 in the middle of the cover 110 (see FIGS. 3A and 4B). The hole 114 has a size so that a user can put his or her finger through it in order to pull up the cover 110. In various embodiments, the cover 110 has two or three such holes 114 symmetrically arranged in the cover 110 around a center of the cover 110 for easy removal.

Figure 3A:
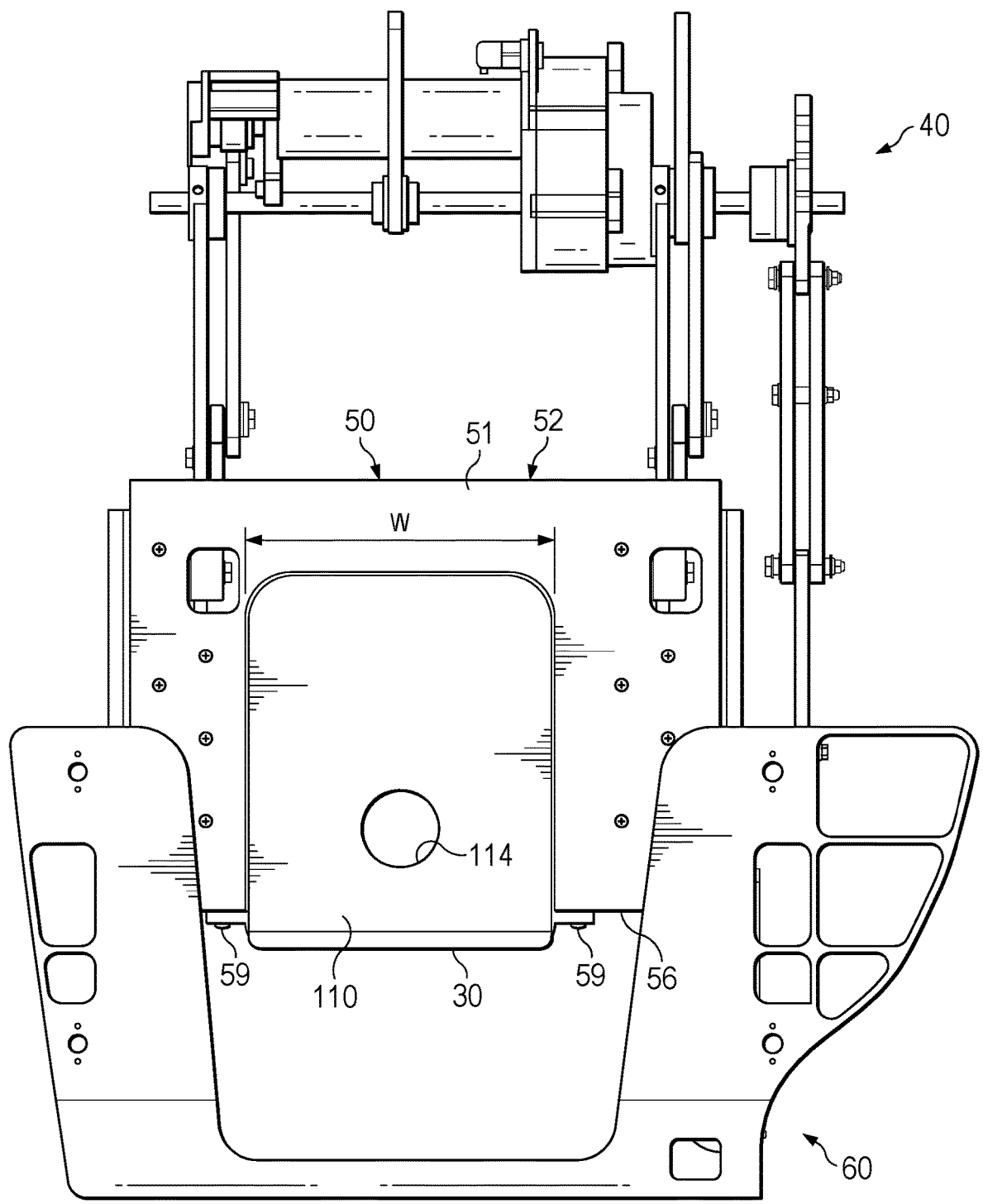
FIG. 3A shows a top view of the leg rest with the life vest container and without the leg rest pad according to embodiments.
Figure 3B:
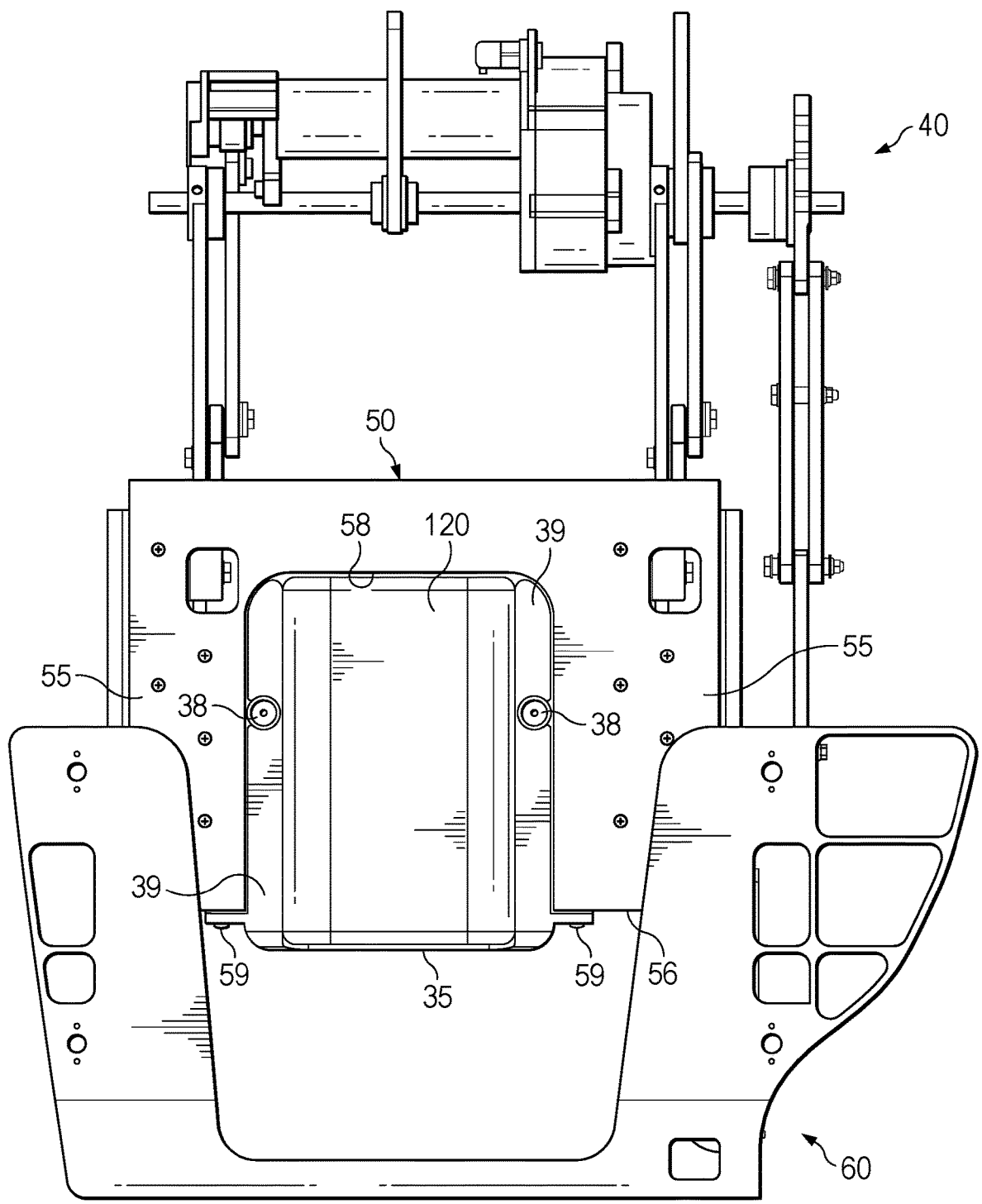
FIG. 3B shows a top view of the leg rest with the life vest container and without the leg rest pad and the cover according to embodiments.
Figure 3C:
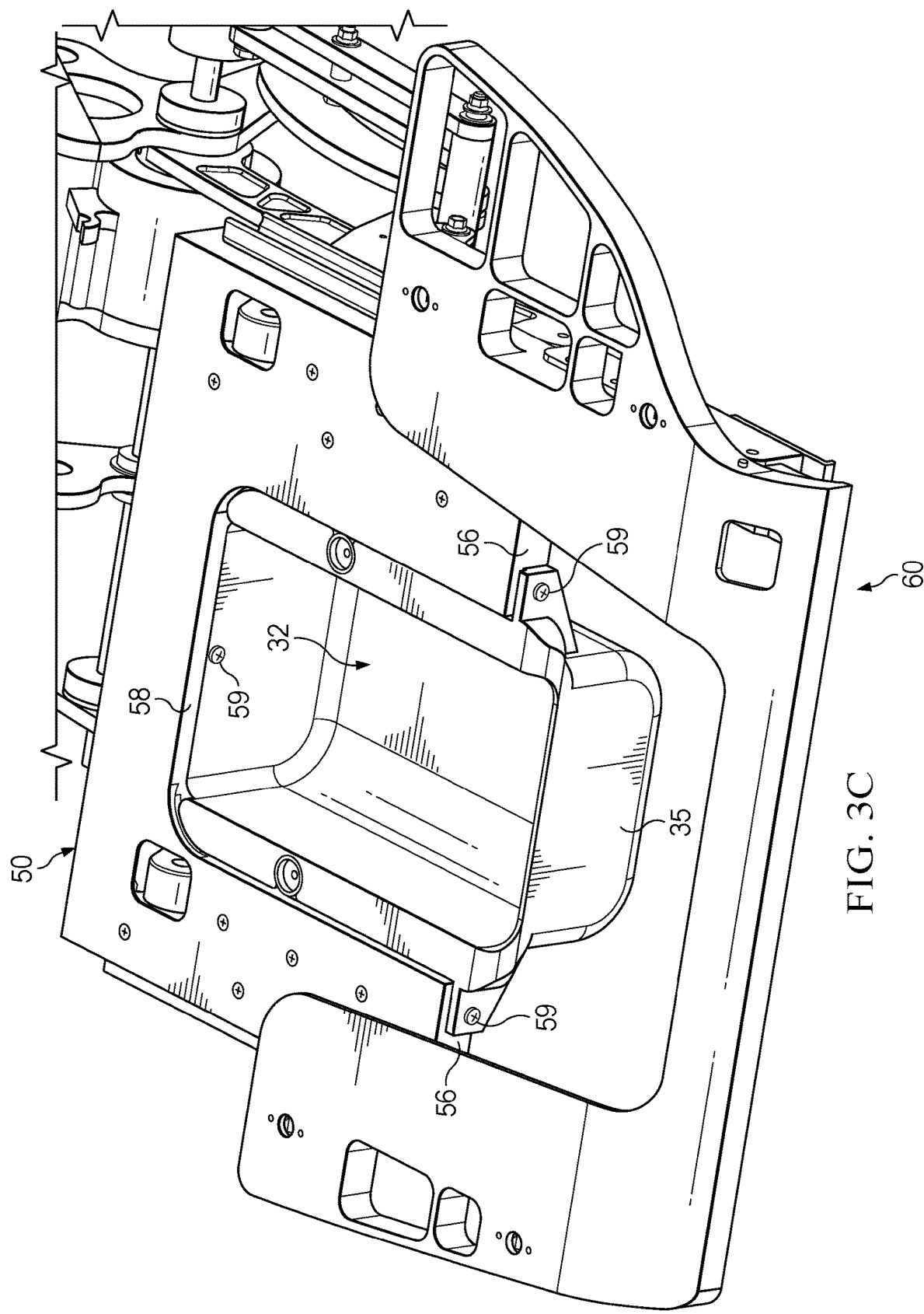
FIG. 3C shows an arrangement of screws fixing the open box of the life vest container to the mounting fixture according to embodiments.
Figure 3D:
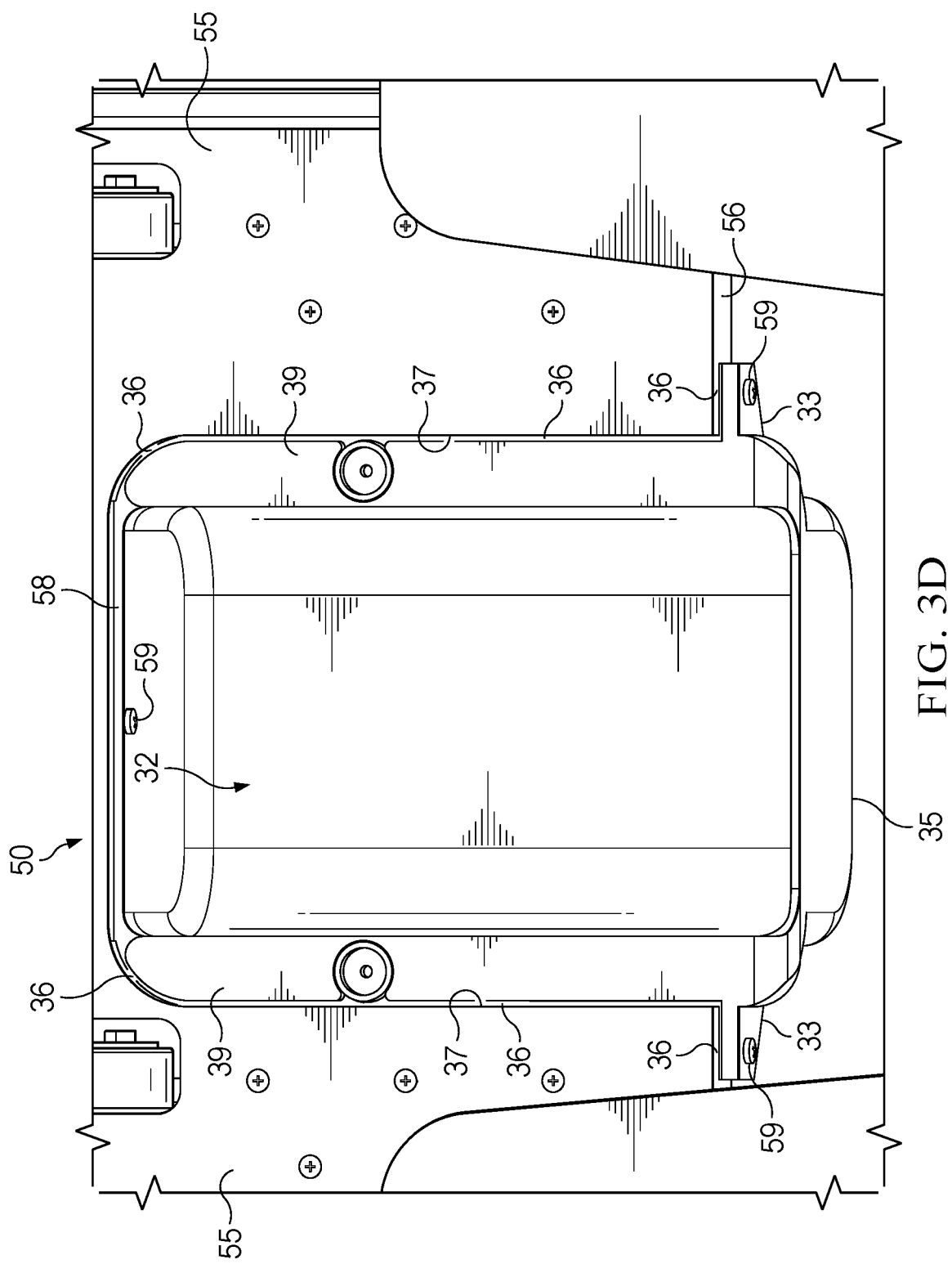
FIG. 3D shows channels between the life vest container and the mounting fixture according to embodiments.
Figure 3E:
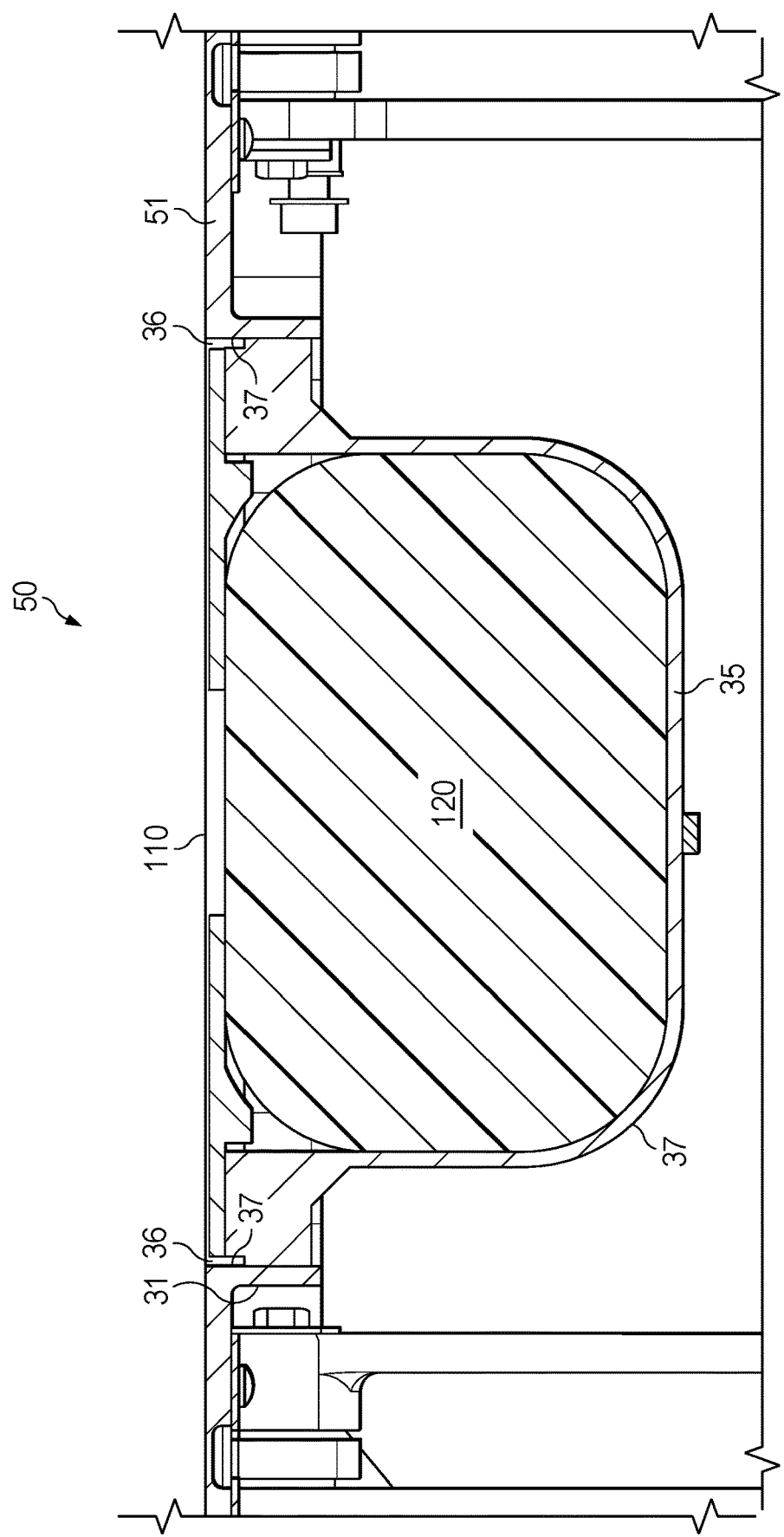
FIG. 3E shows channels in another view between the life vest container and mounting fixture according to embodiments.
Figure 4A:
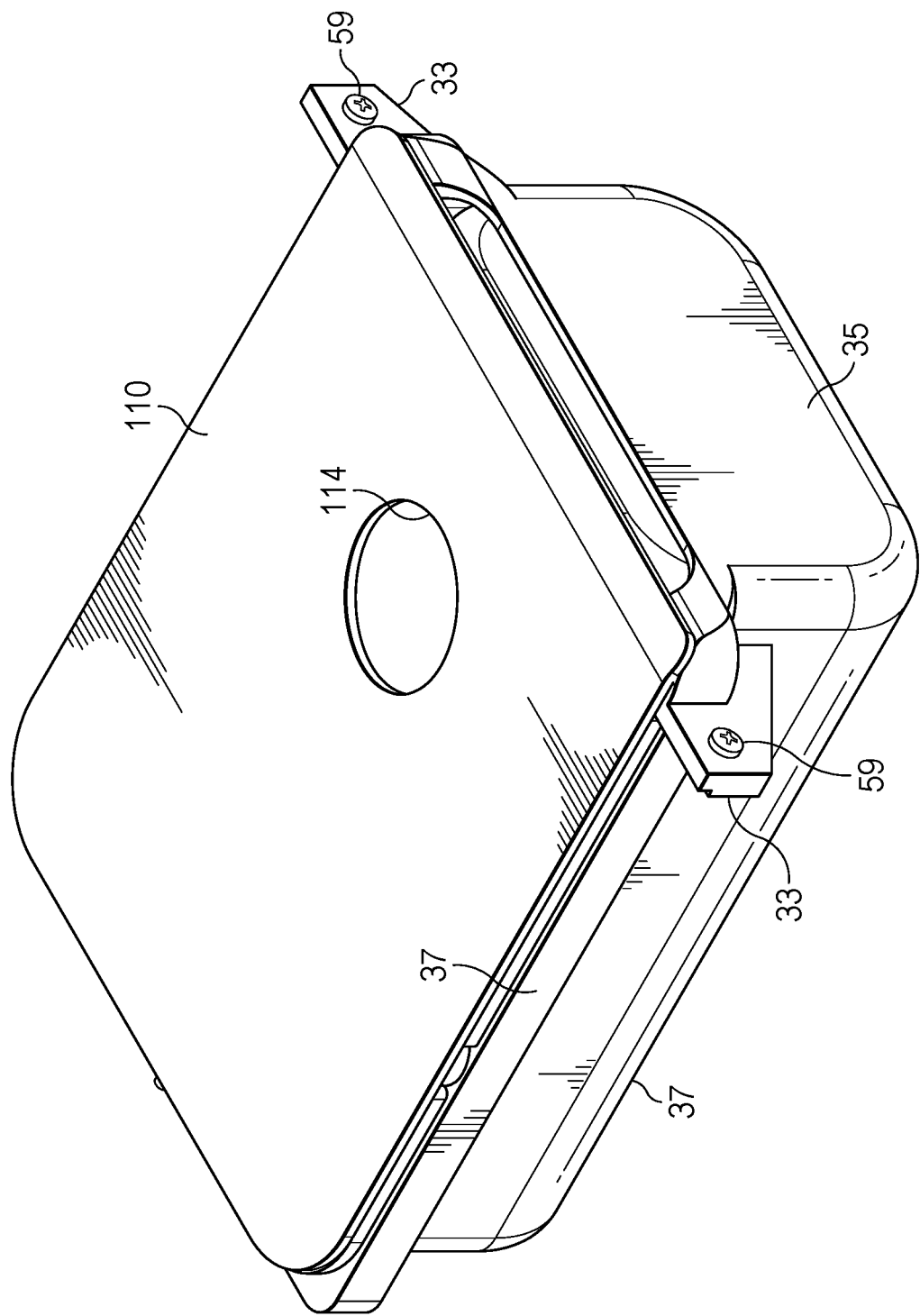
FIG. 4A shows the life vest container as stand-alone device according to embodiments.
Figure 4B:
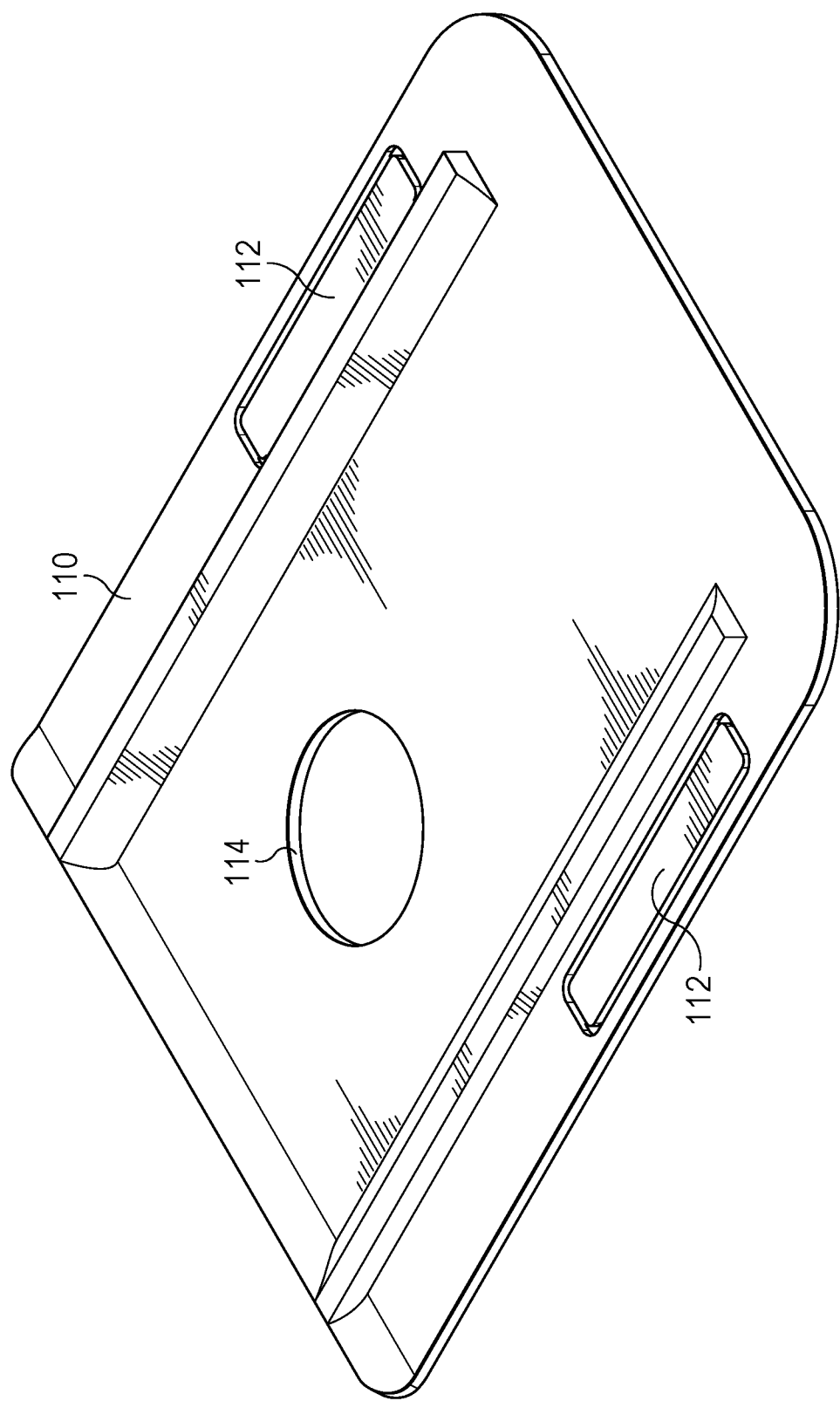
FIG. 4B shows the underside of the cover of the life vest container according to embodiments. The cover shows a rib structure for holding the life vest in place in this embodiment.
Figure 4C:
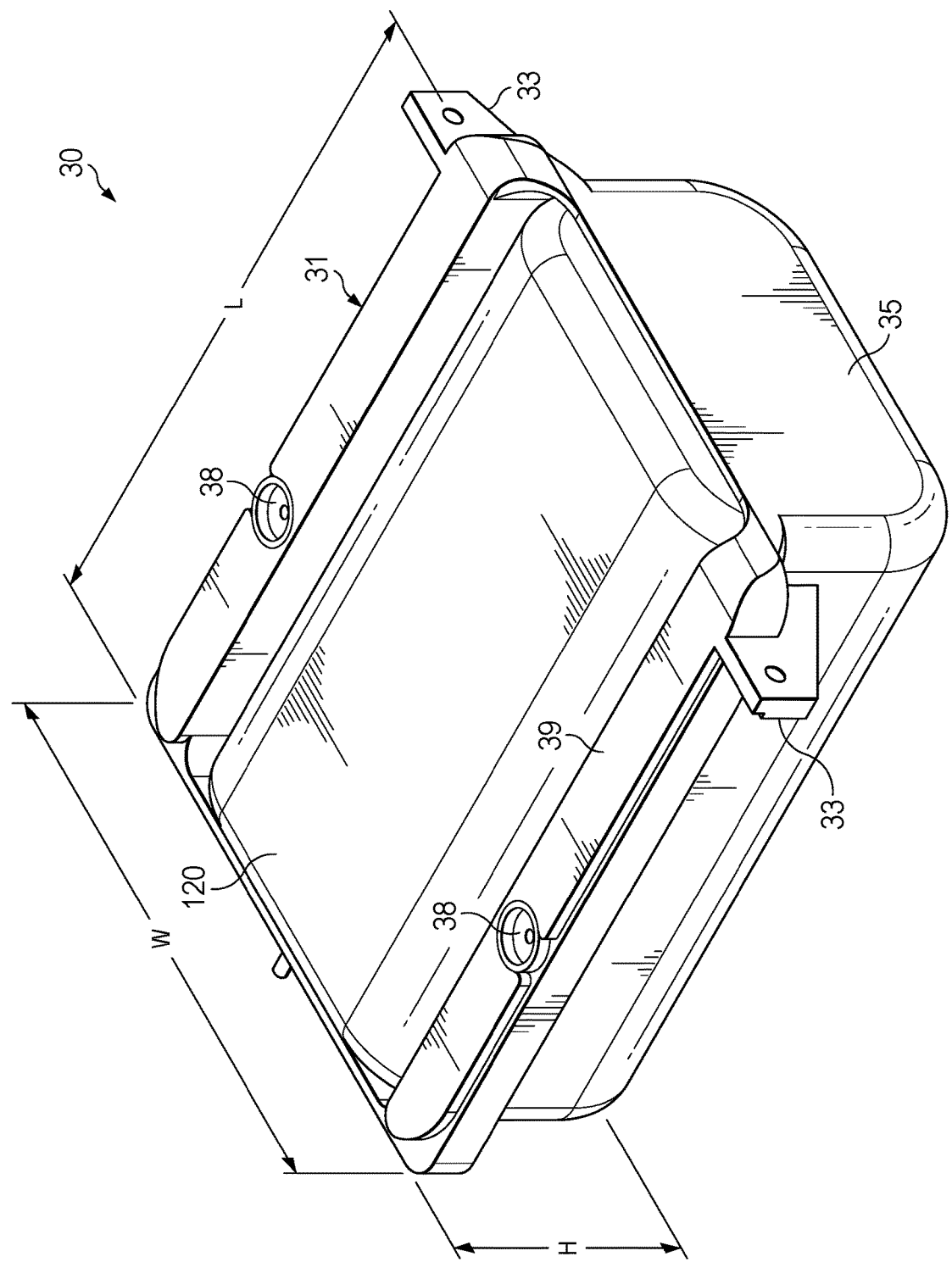
FIG. 4C shows the open box of the life vest container according to embodiments.

The bucket structure or open box 35 has a rim 39 on the top side (see FIGS. 3B and 4C). The container 30 and/or the bucket structure or box 35 or the outside of the bucket structure or box 35 may have the form of a cuboid. Alternatively, the container 30 and/or the bucket structure or open box 35 has other forms such as the form of a trapezoidal prism, e.g., with parallel top and bottom sides and equilateral opposite sides. The container 30 and/or the open box 35 may have sharp edges 37 in places and not sharp edges 37 in other places. In alternative embodiments, the container 30 and/or the open box 35 may have chamfered or alternatively fillet edges 37. As seen in FIGS. 3D and 3E, the outside edges 37 of the open box 35 adjacent to the mounting fixture 50 may comprise channels 36. These channels 36 advantageously allow for leather to be wrapped and pulled over the edges of the leg rest mounting fixture 50 which allows for adhesives to maintain tension in the leather along the inner edges of the U of the mounting fixture 50. Tension in the leather as it is wrapped over a corner provides uniform thickness along the edge which creates a more consistent and tighter fit when the cover 110 is installed. These channels 36 also hide the edges of the leather, which prevents the leather from getting peeled off during repeated use of the system such as removal of the cover 110 or other abrasive scenarios. In practice, the installation of the container 30 may occur after the mounting fixture is wrapped in leather to provide easier access to the tight corners. The channels 36 may allow for the adhesive residue and raw edges of the leather to be hidden.

The cover 110 may be removably fixed to the upper side of the open box 35 via two or more magnets 38 arranged symmetrically at or around the container 30 (see FIGS. 3D and 4C). For example, four, six or eight magnets, or less than 3 or 10 magnets may be used and symmetrically arranged. The magnets 38 may be arranged on the upper side 39 of the open box 35, on the cover 110 or partially on the upper side 39 of the open box 35 and on the cover 110.

As can be seen in FIGS. 3A-3E, the life vest container 30 may tightly fit into U shape of the mounting fixture 50 so that virtually no gap or space is visible between the container 30 and the U of the mounting fixture 50 (except for the channels 36). In embodiments, the top of the container 30 (e.g., the cover 110) may be substantially plane parallel to the plate 51 of the mounting fixture 50 (see FIG. 3E). Alternatively, the top of the container 30 may be located just below the plane defined by the plate 51 of the mounting fixture 50. In further embodiments the container 30 may not extend beyond the top side 56 of the long legs 55 of the U or may end plane parallel with the top side 56 of long legs 55 of the U. Alternatively, the container 30 extends beyond the top side 56 of the long legs 55 of the U. The portions 33 of the container 30, which extends beyond the top side 56 of the long legs 55 of the U, may be orthogonally extended so that they are parallel to the plane defined by the top sides 56 of the Us (see FIG. 3D).

The container 30 may be only secured to the mounting fixture 50 and to no other part of the leg rest 20. The container 30, and in particular the open box 35, may be secured to the mounting fixture 50 via mechanical fixtures 59 such as 3-4 screws as shown in FIGS. 3C-3D. One mechanical fixture 59 may be located at each of the two top side 56 of each long leg 55 of the U and one or two mechanical fixtures 59 may be located at the inner side 58 of the U. Of course, the container 30 might be fixed with other mechanical fixtures 59 than screws such as a combination of mating features used to align the container with the U along a plane parallel to the mounting plate 51 and secured with plastic snap tabs which mate with recesses in the mounting fixture 50 such that once in place, the tabs must be deflected to become unseated before removal is possible. In various embodiments, the container 30 is fixed to mounting fixture 50 with less or more than 4 mechanical fixtures 59 (e.g., screws) such as 6, 8 or 10 mechanical fixtures 59 (e.g., screws) or less than 12 mechanical fixtures 59 (e.g., screws).

The life vest container 30 stores a life vest 120 (see FIGS. 3B, 3E and 4C). The life vest 120 in the container 30 is accessible by removing the pad 70 from the extension frame 60 so that the cover 110 of the container 30 is visible and accessible and then by removing the cover 110 of the container 30.

Figure 5:
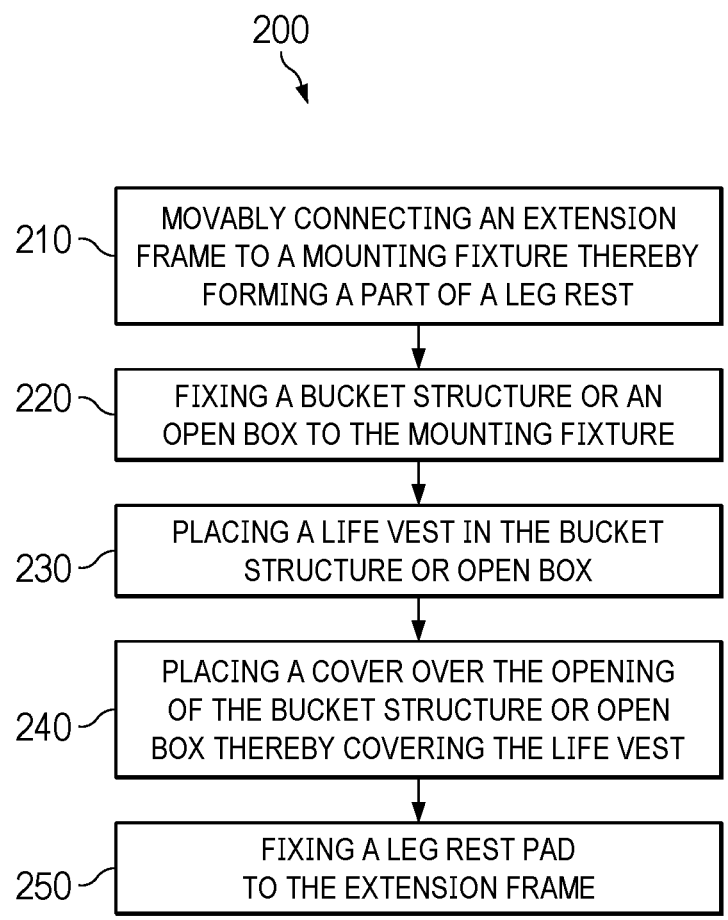
FIG. 5 shows a method for assembling a leg rest with a life vest container according to embodiments.

FIG. 5 shows a method for assembly a leg rest 20 with a life vest container 30. The method 200 comprises, in a first step 210, movably connecting an extension frame 60 to a mounting fixture 50 thereby forming a part of a leg rest 20. The method further comprises, in a second step 220, fixing a bucket structure or an open box 35 to the mounting fixture 50. The bucket structure or open box 35 is fixed to the mounting fixture 50 such that it faces away from the extension frame 60. In a next step 230, a life vest 120 is placed in the bucket structure or open box 35. In yet another step 240, a cover 110 is placed over the opening in the bucket structure or open box 35 thereby closing the structure or box 35 and forming the container 30. In a last step 250, a leg rest pad 70 is (removably) fixed to the extension frame 60. In a further step, the deployment and stowage mechanism 40 and the extension and retraction mechanism may be attached to the mounting fixture 50 and extension frame 60. These steps do not need to be performed in the order recited but can be permuted or combined. For example, the life vest container 30 (with or without the vest 120 and the cover 110) can be fixed to the mounting fixture 50 so that steps 220-240 are performed in one single step. Alternatively, the life vest 120 may be added after the rest of the leg 20 rest is assembled.

Figure 6:
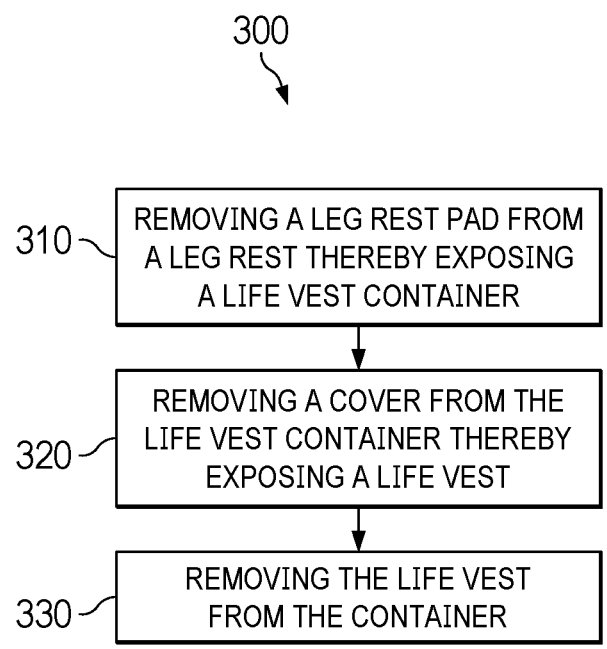
FIG. 6 shows a method for removing a life vest from a life vest container according to embodiments.

FIG. 6 shows a method for removing a life vest 120 from a life vest container 30. In a first step 310, the leg rest pad 70 is removed from the leg rest 20 (or extension frame 60) so that the life vest container 30 is exposed. In a next step 320, the cover 110 of the life vest container 30 is removed so that the life vest 120 is exposed. In another step 330, the life vest 120 is removed from the life vest container 30.

The life vest 120 can be accessed by a user at any stage or angle of the deployment and stowage process, i.e., when the leg rest 20 is stowed, when it is fully extended and when it is in a position between the stowed position and the fully extended position. This requires that even when the leg rest 20 is in a stowed position, i.e., when the mounting fixture 50 and extension frame 60 are closest together (in a proximal position) the life vest container 30 is still accessible by removing the pad 70 and the cover 110 of the container 30. This is advantageously provided by the two Us shapes of the mounting fixture 50 and the extension frame 60.

The life vest 120 can be accessed by the user by placing his or her finger(s) and/or thumb(s) through the at least one hole 114 in the cover 110 and pulling the cover 110 away from the open box 35 thereby separating the magnetic grip.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A leg rest comprising:
   linkages of a deployment and stowage mechanism, the linkages of the deployment and stowage mechanism being connectable to a seat;
   a mounting fixture connected to the linkages;
   a container secured to the mounting fixture, the container being configured to store a life vest;
   an extension frame;
   an extension and retraction mechanism movably connecting the extension frame to the mounting fixture; and
   a leg rest pad removably attached to the extension frame;
   wherein the extension and retraction mechanism is operable to move the extension frame and leg rest pad to uncover, and expose, at least a portion of the container while the leg rest pad is attached to the extension frame.

2. The leg rest according to claim 1, wherein the container comprises a cuboid box having an opening and a cover covering the opening of the cuboid box.

3. The leg rest according to claim 2, wherein the cover is secured to the cuboid box via magnets.

4. The leg rest according to claim 3, wherein the magnets are arranged at a top rim of the cuboid box, and wherein the cover comprises steel plates facing the magnets.

5. The leg rest according to claim 2, wherein the cover comprises a hole in a center of the cover, wherein the hole is accessible by a user for removal of the cover.

6. The leg rest according to claim 1, wherein the mounting fixture comprises a U form.

7. The leg rest according to claim 6, wherein the container is arranged inside the U form of the mounting fixture so that long sides of the container are parallel to long legs of the U form and that wide sides of the container are parallel to a distance between the long legs of the U form.

8. The leg rest according to claim 7, wherein the container is arranged such that a depth of the container faces away from the extension frame.

9. The leg rest according to claim 6, wherein the container comprises channels, and wherein the channels are located directly next to the mounting fixture.

10. A method for assembling a leg rest, the method comprising:
    providing a mounting fixture;
    connecting deployment and stowage mechanism linkages to the mounting fixture, the deployment and stowage mechanism linkages being connectable to a seat;
    fixing a container to the mounting fixture, the container configured to store a life vest;
    providing an extension frame;
    providing an extension and retraction mechanism movably connecting the extension frame to the mounting fixture; and
    providing a leg rest pad removably attached to the extension frame;
    wherein the extension and retraction mechanism is operable to move the extension frame and leg rest pad to uncover, and expose, at least a portion of the container while the leg rest pad is attached to the extension frame.

11. The method according to claim 10, wherein the mounting fixture has a U shape, wherein the container is arranged inside the U shape of the mounting fixture so that long sides of the container are parallel to long legs of the U shape and that wide sides of the container are parallel to a distance between the long legs of the U shape.

12. The method of claim 11,
wherein the extension frame has a form of an U; and
wherein the method further comprises movably connecting the extension frame to the mounting fixture so that the U of the mounting fixture and the U of the extension frame face each other at an open side,
wherein the container is arranged such that a depth of the container faces away from the extension frame.

13. The leg rest of claim 1,
wherein the container has an opening facing a first direction and wherein the opening is configured for accessing a life vest contained within the container, wherein the leg rest pad and the extension frame are disposed above, in the first direction, the opening of the container, and wherein the leg rest pad at least partially covers the opening in the container when the extension and retraction mechanism has extended the extension frame and leg rest pad, wherein the extension frame has an open region that exposes the entirety of the opening of the container when the extension and retraction mechanism has extended the leg rest pad and extension frame and when the extension and retraction mechanism has retracted the leg rest pad and extension frame.

* * * * *